UNITED STATES PATENT OFFICE.

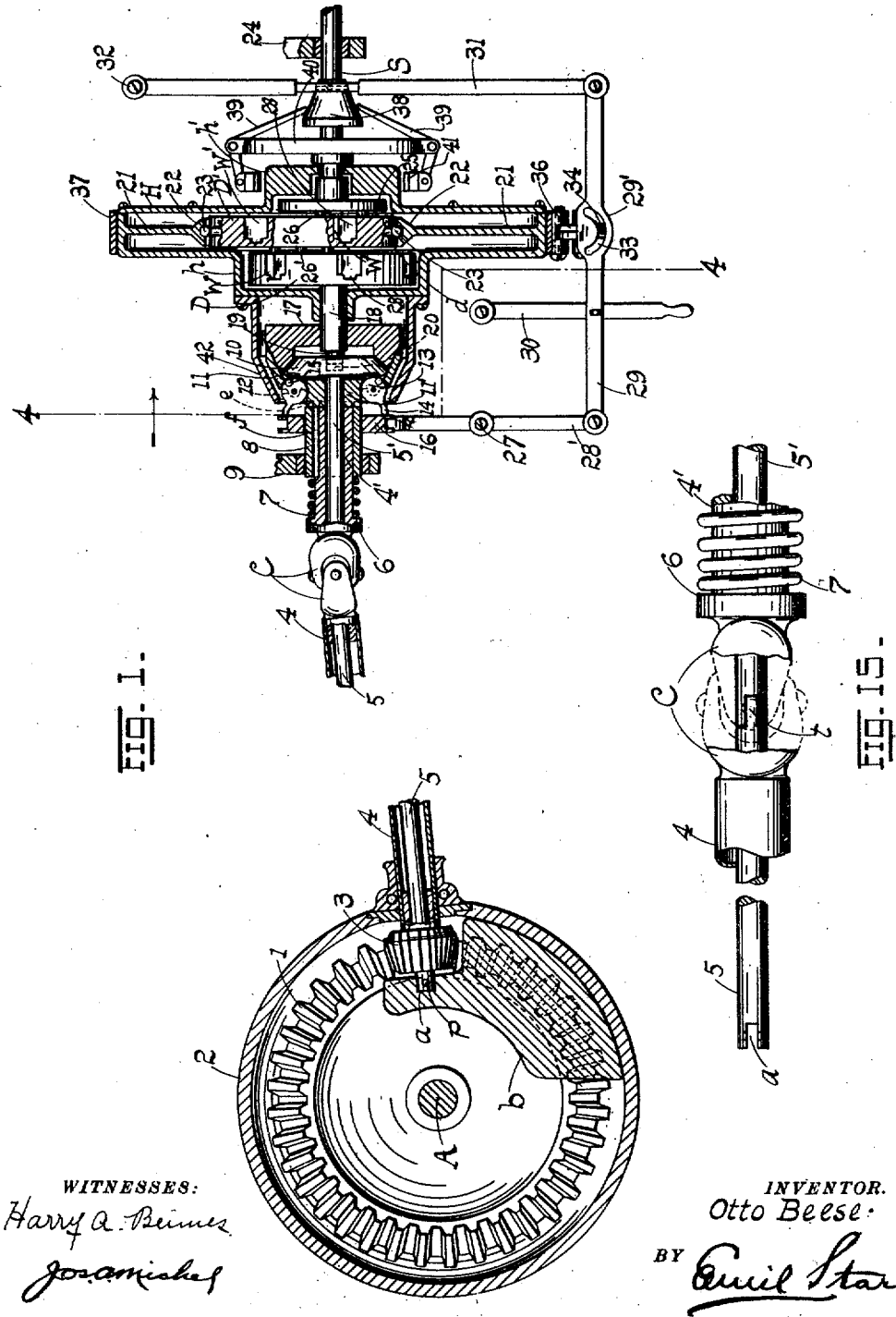

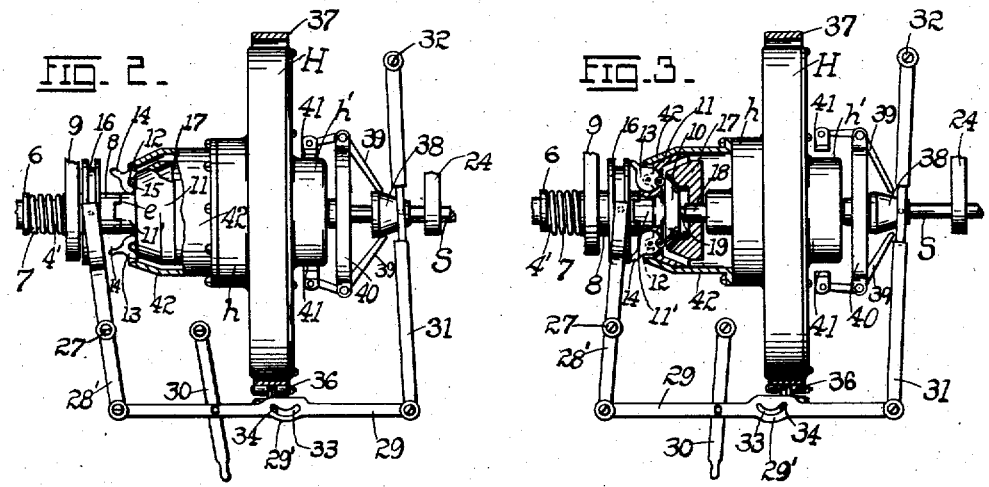

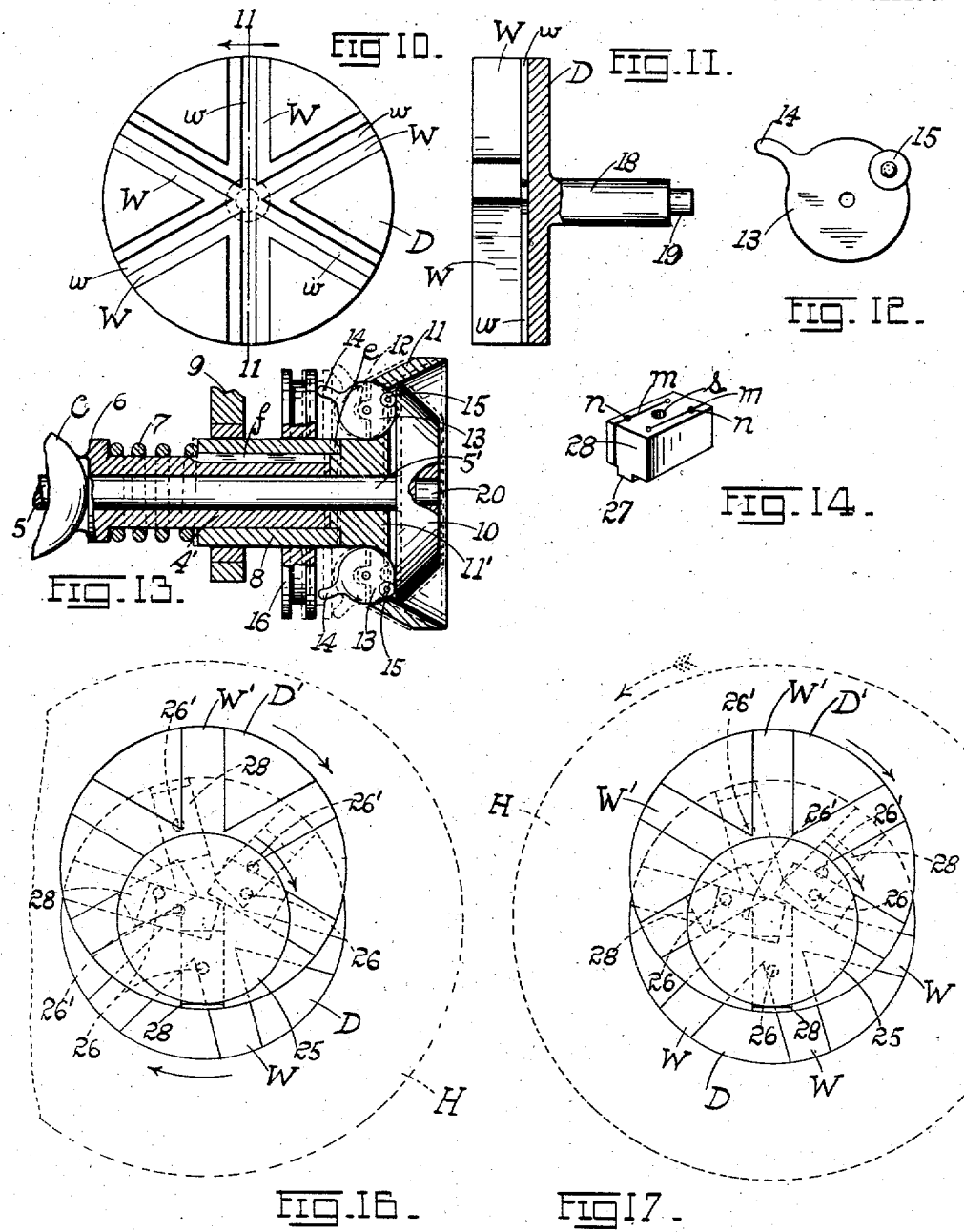

OTTO BEESE, OF ALTON, ILLINOIS.

TRANSMISSION-GEAR.

986,347.

Specification of Letters Patent.   Patented Mar. 7, 1911.

Application filed January 3, 1910. Serial No. 536,163.

*To all whom it may concern:*

Be it known that I, OTTO BEESE, citizen of the United States, residing at Alton, in the county of Madison and State of Illinois, have invented certain new and useful Improvements in Transmission-Gear, of which the following is a full, clear, and exact description, reference being had to the accompanying drawings, forming a part hereof My invention has relation to improvements in transmission-gear; and it consists in the novel details of construction more fully set forth in the specification and pointed out in the claims.

In the drawings, Figure 1 is a middle longitudinal section of the gear mechanism, with parts in central position; Fig. 2 is a side elevation of the transmission gear with parts set to full forward speed; Fig. 3 is a similar view with parts set to reversing position; Fig. 4 is a cross-section on the line 4—4 of Fig. 1; Fig. 5 is an end view of the inner terminal of the motor-shaft; Fig. 6 is a side view of Fig. 5; Fig. 7 is a face view of the outer race-way disk of the multiple gear with slides in position; Fig. 8 is a side view of Fig. 7; Fig. 9 is a cross-section on the line 9—9 of Fig. 7; Fig. 10 is a face view of the inner race-way disk of the multiple gear; Fig. 11 is a cross-section on the line 11—11 of Fig. 10; Fig. 12 is a face view of the cam-disk for changing the direction of rotation of the transmission shaft; Fig. 13 is an enlarged middle longitudinal section of the coupling between the transmission gear and hollow transmission shaft; Fig. 14 is a perspective of one of the slides carried by the race-way disks; Fig. 15 is a plan of the coupled sections of the hollow transmission shaft, parts being broken to show the inner supporting axle or rod; and Figs. 16 and 17 are diagrammatic views of the multiple gear members showing manner of effecting direct and reverse rotation.

The present invention finds special application in connection with self-propelled vehicles or automobiles and has for its object to provide a transmission-gear by which variable speed may be imparted to the vehicle for forward propulsion and which may be instantly reversed in cases of necessity or emergency.

A further object is to provide a gear which may be assembled in a compact form; one instantly responsive to the controlling lever; one composed of a minimum number of parts, simple in construction, readily manipulated, and one possessing further and other advantages better apparent from a detailed description of the invention, which is as follows:—

Referring to the drawings, A, represents the rear or driving axle of a self propelled vehicle or automobile on which is mounted the bevel gear-wheel 1 incased in a shell or housing 2 as well understood in the art. Meshing with the gear wheel 1 is a pinion 3 carried at the adjacent end of an inclined hollow transmission shaft 4, said shaft being supported by the inner cylindrical rod or axle 5, the lower forked end $a$ of which is secured by a pin $p$ passed through the forks and through a supporting bracket $b$ within the housing 2. The parts described, and others shown but not referred to, are well understood in the art, and form no part of the present invention. Forming an extension or continuation of the hollow shaft 4, and coupled thereto by a universal joint C of any approved and conventional design, is the horizontally disposed tube or hollow shaft 4′ which in turn rotates about the inner cylindrical axle or stem 5′ forming an extension of the axle 5, and coupled thereto by a terminal tongue and groove connection $t$ as best shown in Fig. 15, said connection allowing the member 5′ the necessary independent longitudinal movement to which it is subjected during one of the phases of the operation of the transmission gear as presently to be described. The hollow shaft extension 4′ terminates at the end adjacent to the joint C in a flange 6 against which bears one end of an expansion spring 7 coiled about the extension, the opposite end of the spring bearing against the adjacent end of a sliding sleeve 8 feathered to the member 4′ (feather shown at $f$) and rotatable therewith. The sleeve operates through a bearing 9 which thus serves as a support for the members 4′, 5′. The end of the axle extension 5′ opposite the tongue-and-groove connection $t$ terminates in a bevel friction disk 10 which is encompassed by a hollow conical clutch-member 11 the hub-portion 11′ of which is loose on the shaft 5′ and free to rotate about the same. The adjacent ends of the hub 11′ and the sleeve 8 have formed thereon the usual or conventional clutch formations $e$ by which the members 8 and 11 are kept in permanent engagement under the expanding action of the spring 7 which forces the member 8 into forcible contact with the hub 11' of the member 11.

Mounted rotatably between ears or lugs 12, 12 on either side of suitable openings formed in the bottom of the conical member 11 on diametrically opposite sides of the hub 11' are cam-disks 13, provided with levers, arms or fingers 14 as shown (Fig. 12.) On the face of each cam-disk on the side opposite the arm 14 is mounted an anti-friction roller 15 projecting beyond the periphery of the disk (Fig. 12), the rollers being adapted to engage the adjacent face or base of the conical friction disk 10, the cams 13 projecting far enough into the hollow of the member 11 to permit the rollers to thus engage the disk 10.

It will be seen (Fig. 13) that by oscillating the arms 14 outwardly so as to rotate the disks 13 in proper direction to force the rollers 15 against the disk 10, the disk 10 and clutch-member 11 will be forced apart, the disk 10 serving as an abutment for the rollers 15 with the rotation of the cam-disks about their respective axes. The purpose of this action and the means for oscillating the arms 14 and rotating the cams 13 in proper direction will be explained later on, it being sufficient for the present to mention that the necessary oscillation is imparted to the arms 14 by the grooved sliding disk or shifting member 16 loosely mounted on the sleeve 8 in proximity to the cams 13, and in position to be forced into contact with said fingers 14.

The spring 7 by the expansion of which is insured the permanent engagement of the sleeve 8 with the hub 11' of the clutch member 11, likewise serves, in the forward propulsion of the machine to force the member 11 into frictional engagement with the head 17 at the adjacent end of the shaft 18 carried by the inner race-way disk D of the multiple gear to be presently more fully described.

To afford proper support for the shaft 18 the end thereof adjacent to the member 10 is provided with a reduced extension or stem 19 which permanently engages a socket 20 in said member 10 as shown.

The disk D is confined in the annular housing $h$ of the circular casing H, both of which are concentric with the axis of the shaft 18, the outer face of the casing H being provided with a hollow hub $h'$ likewise concentric with the axis of said shaft 18. Within the casing H proper is disposed a central partition wall 21 in which is formed a circular race-way or bearing 22 eccentric to the axis of the casing, said bearing receiving a second disk D' provided with a peripheral groove $d$ for the anti-friction ball bearings 23. Through the axis of the hub $h'$ passes loosely the adjacent end of the motor-shaft S leading from any suitable source of power (not shown) and supported at a convenient point in a bearing 24, the inner end of the shaft terminating within the chamber of the hub $h'$ and adjacent the disk D' in a circular head 25 about the center of which are disposed pins 26 arranged along the circumference of a circle intersecting the axis of the disk D', (Figs. 16, 17), the axis of the head 25 being thus eccentric to the axis of rotation of the disk D'. The face of the disk D' opposite the head 25 is provided with three race-ways or diametric grooves W' intersecting at the center of the disk, the bottoms of the race-ways being formed with depressions or grooves $w'$ for the reception of the tongues 27 of the reciprocating slides or blocks 28 (Fig. 14) operating in the race-ways, the center of each slide being provided with a depression or socket $s$ for the reception of its corresponding pin 26. On the other hand the face of the race-way disk D' opposite the disk D is provided with a similar series of pins 26' which engage the sockets of similar slides or blocks operating in corresponding race-ways W, $w$, in the adjacent face of the disk D, the pins 26' being disposed along a circle concentric with the axis of the disk D' and intersecting the axis of the disk D.

Since the center of rotation of the disk D' is eccentric to the common axis of rotation of the disk D and head 25, and since the circles defined by the positions of the respective sets of pins 26, 26', are equal, it follows that the traverse of the circle identified with the pins 26 will be on one side of (or below) the axis of the disk D', while the traverse of the circle identified with the pins 26' will be on the opposite side of (or above) the axis of the disks D, (Figs. 16, 17). Again, since the pins 26 drive the disk D', and the pins 26' drive the disk D it follows from the relative position of the parts, that for four revolutions of the head 25 (or shaft S) there would be imparted two revolutions to the disk D', and one revolution to the disk D (and hence to its shaft 18 and head 17) assuming of course that the casing H is itself held against rotation. Four revolutions of the motor shaft S to one revolution of the head 17 corresponds to a slow forward speed of the vehicle, in which event the casing H must be held against rotation. This is accomplished by the controlling mechanism to be now described. Pivoted at a point 27 is a shifting lever 28' the forked terminal of one arm of which engages the grooved portion of the sliding disk 16, the end of the opposite arm being pivotally connected to the adjacent end of a link 29 actuated by a hand-lever 30 pivoted at one end and loosely coupled to the link, the opposite end of the link 29 being pivotally secured to the adjacent end of a lever 31 pivoted at 32 at the opposite end. Between the lever 30 and 31, the link 29 is provided with an enlargement 29' in which is formed a curved slot 33 convexed outwardly, said slot being traversed by a stud 34 projecting laterally from the boss 35 (Fig. 4) which is in hinged relation to the links 36, 36, pivotally coupled to the ends of the brake-band 37. The brake-band and links are not new, the construction shown being a conventional one for a brake-band of this character. By oscillating the controlling lever 30 to the right or left (Figs. 1, 2, 3) it is apparent that longitudinal movement or reciprocation will be imparted to the link 29. When the parts are in their central position (Fig. 1) wherein the stud 34 occupies the center of the curved slot 33, at which point the stud is farthest from the periphery of the casing H, the necessary draft has been exerted upon the ends of the brake-band 37 to draw the latter tightly about the casing H and hence hold the same against rotation. By swinging the lever to the right or left (Figs. 2, 3) the stud is forced to the ends of the curved slot 33 and toward the casing thereby relaxing the tension on the band and releasing the casing and leaving the same free to rotate in either direction.

Mounted loosely and slidingly on the shaft S between the bearing 24 and hub $h'$, is a cone 38 the sides of which are adapted to be engaged by the free ends of the long arms of the bell-crank levers 39 pivoted at diametrically opposite points to a bar, plate or equivalent member 40 keyed to the shaft S, the ends of the short arms of the bell-cranks carrying shoes 41 which are adapted to brake against the hub $h'$. For it is apparent that by moving the cone 38 toward the bearing 24 so as to part or diverge the long arms of the bell-cranks, the short arms will be forced toward the hub $h'$ and thus set the brake-shoes 41 thereby coupling the motor-shaft S to the casing H in which event the casing (by this time released from the brake-band 37) is free to rotate with the motor-shaft S and at the same rate of speed. This condition prevails for and corresponds to the maximum or full forward speed of the car as presently to be seen. Screwed or otherwise secured to the face of the housing $h$ is a shell or clutch-casing 42 terminating in a conical end of the same pitch with the clutch-member 11, the purpose of which casing will be best apparent from a description of the operation of the invention which is as follows:—The operation may be described with reference to three distinct positions of the controlling lever 30, the prevailing position being the central one as shown in Fig. 1. When in that position, the slot 33 will have drawn the stud 34 outwardly thereby drawing the band 37 tightly about the casing H and holding the latter against rotation. In that position the ends of the long arms of the bell-crank levers 39 are just touching the inclined walls of the cone 38, and the sliding disk 16 is just contacting with the fingers or arms 14 of the cam-disks 13, and the member 10 just clears the head 17. Likewise the spring 7 has forced the sleeve 8 into engagement with the hub 11' of the clutch 11, and has forced the latter into positive and frictional engagement with the head 17 which is itself secured to the shaft 18 of the adjacent race-way disk D forming the inner member of the multiple gear series (D, D', 25) identified with the casing H. Assuming therefore that the motor-shaft makes four revolutions in a given period, it follows that the head 25 carried thereby will make four revolutions, said head imparting two revolutions to the disk D' which in turn imparts one revolution of the disk D and its head or male clutch-member 17. From the member 17 rotation is communicated to the member 11 which in turn rotates the sleeve 8, but as the latter is feathered to the hollow shaft-extension 4' the said extension through the medium of the joint C will impart a corresponding rotation to the shaft 4, which in turn through the pinion 3 and bevel gear 1 imparts rotation to the axle A, (or to any multiplying gear which may be interposed between the axle and the gear 1). The central position of the lever 30 thus corresponds to the slow forward travel of the car. Let us now assume that the lever 30 has been oscillated to the right or to the position indicated in Fig. 2. It will be seen that the medial portion of the lever 31 is looped about or equivalently connected to the small end of the cone 38 (the same as an ordinary clutch-lever) so that when the lever 30 has been swung to the right, the cone 38 is shifted in the same direction, the inclined walls thereof parting the long arms of the bell-crank levers 39 and oscillating the short arms thereof toward the hub $h'$ of the casing H, thereby setting the brakes or shoes 41 tightly against the hub and thus clamping the entire casing H to the motor shaft S. In this movement the stud 34 has passed to the left hand end of the curved slot 33 so that the tension on the band 37 has been relaxed and the casing H released. At the same time the lever 28' has shifted the disk 16 away from the cams 13, but the action of the spring 7 has in no wise been disturbed. So that the shaft S rotates it will carry the casing H bodily around with it imparting thereto an equal number of revolutions, the shaft and casing rotating as a unit. This position therefore corresponds to the full or maximum forward speed of the car (no individual or independent rotation being imparted however to the parts 25, D', D, since they all rotate with the shaft S and the casing H). Again, let us assume that the lever 30 has been oscillated to the left as shown in Fig. 3. In that case the cone 38 has released the hub $h'$ of the casing H, and the band 37 has relaxed its grip on the casing, the stud 34 having passed to the right hand end of the curved slot 33. In said movement however, the lever 28' has forced the disk 16 against the arms 14 of the cams 13 rotating or rocking the latter about their respective axes, causing the rollers 15 to brace themselves against the member 10 thereby driving the latter forcibly against the head 17 and locking said head against rotation. It is for the slight movement to which the head 10 is thus subjected that the tongue and groove connection $t$ (or its equivalent) between the axle 5' and axle 5 becomes necessary. By the time the cams have been rocked their full extent with the shifting of the disk 16 in the direction indicated, the travel of the rollers 15 over the face of the now stationary member 10 (which thus serves as an abutment against which the rollers may brace themselves) forces the clutch member 11 into positive contact with the conical terminal of the shell or clutch-casing 42 (secured to the casing H) the spring 7 being in a measure compressed, the retraction of the member 11 from engagement with the head 17 into engagement with the shell 42 necessarily moving the sleeve 8 toward the shoulder 6 and thus to that extent compressing the spring 7 (Fig. 13). It follows therefore, that for the third position of the controlling lever 30 (Fig. 3) not only is the head 17 (and hence the disk D) held against rotation by the jamming or driving of the member 10 against said head 17, but the clutch members 11 and 42 are brought into positive contact, permitting the member 11 to participate in any rotation to which the shell 42 or the casing H may be subjected under the circumstances. What this rotation is may be best gathered from Figs. 3 and 17: Assuming the shaft S to make four revolutions in a given time, it is apparent that two revolutions will be imparted to the disk D' in the same direction; but since the disk D is held against rotation and the casing H as a whole is free to turn (the band 37 having been relaxed) it follows that since the disk D can not turn with the disk D', said disk D will now act as a stationary abutment against the sides of whose raceways W the pins 26' and blocks 28 of the disk D' can brace themselves thereby constraining the entire casing H to rotate as a body, not in the same direction with the disk D' but in the reverse direction. Where the disk D rotates in the same direction with the disk D' the former will revolve at one-half the speed of the latter as already explained; but where the disk D is locked against rotation, the revolution which the disk D loses when revolving with the disk D' is added to the number of revolutions of the casing in its reverse rotation, so that for four revolutions of the shaft S the casing will make three revolutions in the opposite direction. We thus develop three reverse revolutions of the casing H (and hence of the shaft 4) to four direct revolutions of the motor shaft S.

The race-way disks D, D' and the manner of driving the same from a shaft or axis eccentric to their respective axes of rotation (shown diagrammatically in Figs. 16, 17) are not new, this form of mechanical movement being well known in the art; but the specific disposition of such race-disks in a casing adapted to be held against rotation under certain circumstances, and to be allowed free rotation under other circumstances, is believed to be new. The action of the blocks 28 is of course well understood, each block as it drives the disk being free to reciprocate across the axis of the disk through the particular race-way in which the block is confined.

To always insure good contact between the sides of the race-way and the block, the latter is split along opposite faces to a certain depth $m$, $m$, (Fig. 14), and when the block wears loose the yielding outside walls of the splits may be forced into firm contact by the spreading screws $n$. This feature however, is not claimed as it is a well known expedient in the arts.

Having described my invention, what I claim is:—

1. In combination with a casing rotatable about a central axis, a motor-shaft disposed along said axis on one side of the casing, a transmission-shaft about the same axis on the opposite side of the casing, a pair of coöperating race-disks mounted eccentrically to one another in the casing, one of said disks being concentric with the axis aforesaid and the other eccentric thereto, means on the transmission shaft for coupling the same to the adjacent race-disk, means on the motor-shaft for clutching the casing directly to the shaft, whereby the casing may rotate in unison with said motor-shaft, and controlling means for releasing the casing to permit of such rotation.

2. In combination with a casing rotatable about a central axis, a motor-shaft disposed along said axis on one side of the casing, a transmission shaft on the opposite side of the casing disposed about the same axis, a series of transmission members mounted rotatably in the casing and relatively eccentrically to one another, means for imparting rotation to said members from the motor-shaft, a clutch-head secured to the member adjacent to the transmission shaft, a spring-controlled clutch member for coupling the transmission shaft to the clutch-head aforesaid, a shell carried by the casing and enveloping the clutch-member, and devices under the control of the operator for disengaging the clutch head from the spring-controlled clutch member and forcing the latter into engagement with the shell, and simultaneously holding the clutch-head and transmission member thereof against rotation, and means for releasing the casing to afford freedom of rotation thereof about its axis.

3. In combination with a casing rotatable about a central axis, a hollow transmission shaft disposed on one side of the casing about said axis, a transmission disk mounted in the casing concentrically with the axis thereof, a clutch-head coupled to the disk and located outside the casing, an axle in the hollow shaft, a friction disk terminating said axle opposite the clutch-head, a spring-controlled sleeve slidingly feathered to the hollow-shaft, a clutch member on the axle normally forced by the sleeve into engagement with the clutch-head, a shell carried by the casing and encompassing the clutch-member aforesaid, a pair of diametrically opposite finger-cams rotatably mounted on the clutch-member and normally engaging the friction-disk aforesaid, a shifting member on the sleeve adapted to engage the cam-fingers, a controlling lever, a brake for holding the casing against rotation, and intermediate connections between the brake and shifting member for forcing the latter against the cam fingers thereby driving the friction disk into positive engagement with the clutch-head and releasing the latter from the clutch-member and forcing the clutch-member into engagement with the shell, and simultaneously releasing the brake from the casing.

4. In combination with a rotatable casing provided with a series of race-disks mounted in eccentric relation to one another, a motor-shaft, a transmission shaft, means under the control of the operator for transmitting rotation from the motor-shaft to the transmission shaft either through the disks or through the casing, said controlling means comprising as a part thereof suitable intermediate connections for holding the casing stationary or releasing the same according to the character of transmission desired.

5. In combination with a rotatable casing provided with a series of race-disks mounted in eccentric relation to one another, a motor-shaft, a transmission shaft, means under the control of the operator for transmitting rotation from the motor-shaft to the transmission shaft either through the disks or through the casing in the same direction with the motor-shaft, said controlling means comprising as a part thereof suitable intermediate connections for holding the casing stationary or releasing the same according to the character of transmission desired, and means for reversing the rotation of the casing and of the transmission shaft.

In testimony whereof I affix my signature, in presence of two witnesses.

OTTO BEESE.

Witnesses:
EMIL STAREK,
JOS. A. MICHEL.